June 13, 1972   E. BRICHARD ET AL   3,669,640
REFRACTORY ELEMENTS FOR A GLASS FLOAT FURNACE WALL
Filed Oct. 29, 1969   4 Sheets-Sheet 1

INVENTORS
EDGARD BRICHARD
JOSEPH DECLAYE
BY Edmund M. Jaskiewicz
ATTORNEY

United States Patent Office 3,669,640
Patented June 13, 1972

3,669,640
REFRACTORY ELEMENTS FOR A GLASS FLOAT FURNACE WALL
Edgard Brichard, Jumet, and Joseph Declaye, Moustier-sur-Sambre, Belgium, assignors to Glaverbel, Watermael-Boitsfort, Belgium
Filed Oct. 29, 1969, Ser. No. 872,099
Claims priority, application Luxembourg, Oct. 30, 1968, 57,196
Int. Cl. C03b 18/00
U.S. Cl. 65—182 R
19 Claims

ABSTRACT OF THE DISCLOSURE

A furnace tank for use in the production or treatment of glass floating on a bath of molten material has at least one wall formed of a refractory element. The element comprises a refractory body having a refractory coating different in composition from the body adhering to at least a portion of that face which is directed toward the interior of the tank. The refractory coating is preferably applied to a face of the body in the flowable state and sets in situ.

---

The present invention relates to furnace tanks employed in the production or treatment of flat glass floating on a bath of molten material, more particularly, to a refractory element for constructing a wall of such a furnace tank and the process of treating flat glass floating in such a furnace tank.

Glass has been manufactured by casting glass on the surface of a bath of molten material so that the glass spreads out to form a flat ribbon which is progressively cooled as it advances along the surface of the bath. Various processes have also been carried out for modifying the geometrical, physical and/or chemical properties of a glass ribbon or of pieces of glass while floating on such a bath of molten material. In the construction of such furnace tanks or float tanks various refractory materials generally in the form of prefabricated blocks have been employed for forming the tank linings. It is not only necessary that such refractory linings provide good heat insulation but must also satisfy various requirements relating to mechanical strength and physical behaviour at the high temperatures encountered within the tank during operation. In the present state of the art those refractories which have the required heat-insulating and mechanical properties generally do not have those chemical and surface properties which would permit their exposure to the contents of such a furnace tank during high operating temperatures. One of the major difficulties encountered with existing refractory materials in such float tanks is the strongly corrosive nature of the material of the molten bath. The bath generally comprises a molten metal, such as molten tin or silver or a molten metal salt. These molten materials have a strong corrosive action on most of the refractory substances used in the manufacture of refractory blocks.

A vitreous phase which has less density than the molten material of the bath occasionally becomes released or is formed at the interior surfaces of the refractory blocks at the working temperatures of the furnace. When the refractory blocks attain a sufficiently high temperature particularly when in contact with the molten material of the bath, the vitreous phase may have such a low viscosity that after a certain period of time quantities of the vitreous phase accumulate and form drops which rise through the bath to the surface upon which the glass is floating. These drops may contact the glass which is in the process of being treated on the bath. When this occurs the drops of vitreous phase are carried away by the glass moving along the bath and there are formed very long fibers of vitreous phase which spoil an appreciable area of the floating glass.

Some refractory elements which are used because of their good heat-insulating and mechanical properties are chemically attacked by the molten material of the bath at the high operating temperatures of the furnace. The chemical attack results in the formation of gaseous phases which enter the atmosphere within the furnace over the bath and make it extremely difficult to control properly the composition of this atmosphere as required for high quality processing of the glass.

Corrosion as described above is only one factor which must be carefully considered in selecting refractory materials for the lining of a float tank. Another problem is the tendency for the floating glass to adhere or stick to the walls of the tank if the glass should come in contact with the walls because of some flaw in the process. During the production of flat glass, if the floating glass ribbon contacts a wall of the tank and the glass adheres to the refractory material, the forward movement of the ribbon will be impeded and the quality of the glass will be adversely affected.

It is therefore the principal object of the present invention to provide a novel and improved refractory element for use in constructing a wall of a furnace tank for the production or treatment of flat glass floating on a bath of molten material.

It is a further object of the present invention to provide a furnace tank and a wall for such a furnace formed of a refractory element which not only has heat-insulating properties but is resistant to the corrosive chemical action generally encountered in a furnace tank containing a bath of molten material upon which glass is floated.

According to one aspect of the present invention there is disclosed a refractory element for forming a wall of a furnace tank used for the production or treatment of flat glass floating on a bath of molten material. A refractory element may comprise a refractory body with a face of this body being directed toward the interior of the furnace. A refractory coating adheres to at least a portion of this face of the refractory body and has a composition different from that of the refractory body. The refractory coating may be applied when in the flowable state so as to become set in situ. The coating may comprise tungsten or a refractory material such as carbon or a carbon-rich substance dispersed in a binder. The coating may be formed only on the interior face of the refractory body, on several faces or on all of the faces so as to completely envelope the body.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
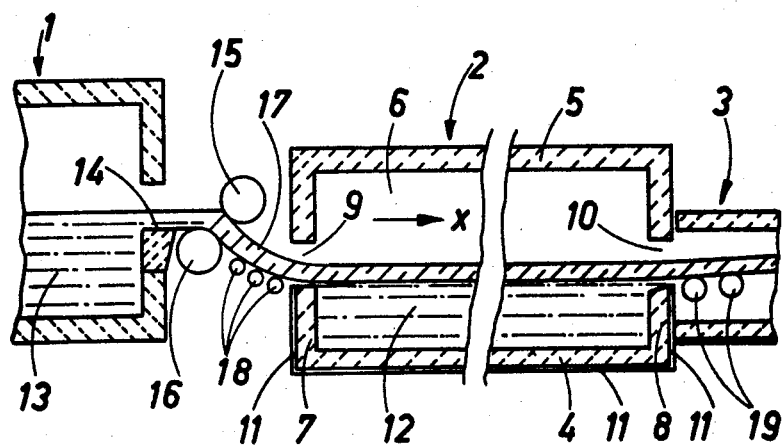
FIG. 1 is a longitudinal vertical sectional view of a float tank used in the manufacture of flat glass by the float process.

In FIG. 1 there is illustrated diagrammatically a float glass installation comprising a tank furnace 1, a float tank 2 and an annealing lehr 3. The float tank 2 comprises a bottom floor 4, a crown 5, side walls 6 and end walls 7, 8. The end walls 7, 8 are separated from the crown 5 by slots 9, 10 respectively. These described components of the float tank are made completely or partially of refractory blocks having coatings of a different refractory substance on their faces directed toward the interior of the float tank.

A metal wall or shell 11 hermetically seals and encloses the bottom 4, the side walls 6 and the end walls 7, 8 of the tank which contains a bath 12 of molten material. The bath 12 may comprise a molten metal salt or a molten metal, such as tin or silver.

The tank furnace 1 contains a bath of molten glass 13 which flows over a casting lip 14 between casting rollers 15, 16 which form a ribbon of glass 17. The glass ribbon is then conveyed by transporting rollers 18 through the slot 9 into the float tank and is deposited on the bath of molten material 12 to move thereon in the direction of the arrow X. The advancing glass ribbon 17 receives a fire polish on the bath of molten material 12 and progresses toward the slot 10 of the float tank where it is conveyed by rollers 19 to the annealing lehr 3.

Figure 2:
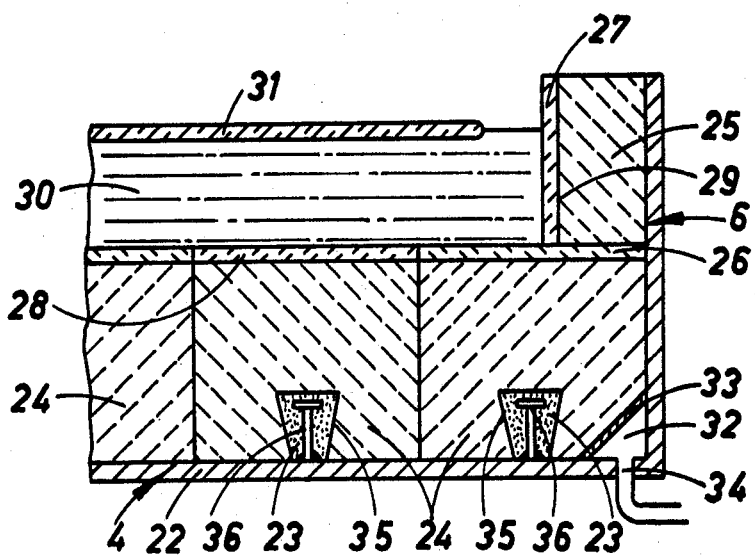
FIG. 2 is a transverse sectional view in enlarged scale of a portion of the bottom and adjoining side wall of the float tank of FIG. 1.

Proceeding next to FIG. 2 the bottom, side and end walls of the float tank are enveloped by a metallic wall 22 which corresponds to the metallic shell 11 of FIG. 1. The bottom wall of the float tank of FIG. 2 comprises a layer of refractory blocks 24 positioned side by-side on the bottom metal wall 22. The side wall 6 is formed by a refractory block 25 similar to the blocks 24. The bottom faces of the blocks 24 forming the bottom wall 4 are provided with cavities or recesses 35 which receive anchoring rods 36 welded to the inner surface of the metal wall 22. The anchoring rods 36 are imbedded in a refractory concrete 23 which fills the cavities 35.

The refractory blocks 24, 25 are provided with layers or coatings 26, 27 of a refractory ceramic material on their faces 28, 29 directed toward the interior of the furnace. The coating contains at least 50% carbon in the form of grains or particles enclosed in a tar binding agent. The blocks are composed mostly of silica and have a porosity of about 23%. The blocks have been heated to a temperature of 1200° C. for 24 hours for degasification purposes.

The layers 26, 27 being on the interior surfaces of the furnace wall are in contact with the molten bath 30 upon which a glass ribbon 31 floats. The carbon-rich coatings have a thermal conductivity which is substantially greater than that of the refractory blocks. A thermal conductivity of this magnitude insures the thermal homogenization of the bath 30 and the more uniform transfer of heat along the walls to avoid or reduce temperature gradients in the molten bath. The thermal conductivity of the refractory coatings 26, 27 is preferably at least 5 kilocalories per meter per hour per degree centigrade.

The lower outside edges of the outermost row of blocks 24 are truncated so as to define inclined surfaces. These aligned inclined surfaces form a space 32 between the blocks 24 and metal wall 22 extending over the length of the tank. A metal plate or sheet 33 is spot welded to the interior of the metal wall 22 to provide a rigid wall for the space 32. This space is subjected to a negative pressure so that any evolved gases are drawn into this space and evacuated through an opening 34.

Refractory ceramic having compositions other than that described above may also be used. Another illustrative example of a refractory block which can be employed in the present invention is of a clay type composition containing about 35% alumina and accurately molded at high pressure to have certain predetermined dimensions and shape and to have a low porosity below 16%. For very severe operating conditions high alumina refractory blocks may be preferred which have an alumina content of at least 60% with the remainder being silica. For those portions of a furnace wall which are extremely heavily stressed refractory ceramic bodies can be used comprising corundum with an alumina content of at least 90%. Such bodies have a density greater than 3 and are therefore of low porosity.

Magnesium oxide bricks may also be used.

Regardless of the composition of the refractory body it is preferred that those surfaces to which the coating is to be applied be rough or irregular. A rough or irregular surface improves the bond between the coating and the body and contributes to the satisfactory performance of the refractory element as a whole.

Instead of the carbon-rich coatings as described above other coatings which have adequate heat-conductivity and have the advantage of not sticking to molten glass include silicon carbide, boron nitride of tungsten.

Carbon or a carbon-based coating has many advantages as a coating material for the tank bottom, side and end walls at least up to a level above the bath surface. It is preferable that the thickness of a carbon coating be between 10-15 mm. if it is desired that the coating have good thermal conductivity for the purpose of reducing temperature gradients in the bath or in any given part thereof. Another advantage of carbon is that molten or plastic glass has little or no tendency to stick to it and thus it is desirable to employ a carbon or a carbon based coating on those walls of the tank with which the floating glass ribbon may make contact. Abrasive wear of the tank wall is also significantly reduced by the presence of a carbon coating.

The use of carbon is particularly advantageous in those situations in which a reducing atmosphere must be maintained. The carbon will maintain the reducing nature of the atmosphere in spite of any leakage of air into the tank. Such leakage of air will exist since the tank cannot be perfectly hermetically sealed.

It is pointed out that the term "carbon" includes both graphite and amorphous carbon. Not only does a carbon coating have the desired thermal conductivity but it has high stability at all temperatures under working conditions of the furnace. Carbon will not give off liquid or gaseous phases and guards against the evolution of such phases from the coated refractory body. The presence of such a carbon coating prevents the molten material of the bath from making contact with the refractory bodies which are less corrosion resistant or chemically stable. The carbon coating will protect the refractory walls from the action of alkaline or other vapors which may be present in the furnace atmosphere.

The refractory coating composition may comprise refractory materials dispersed in a binder. Various kinds of binding agents can be used, depending upon the nature of the refractory body to be coated in order to obtain good adherence of the coating. It may be desirable for the binding agent to have approximately the same chemical and mineralogical composition as the coated refractory body. The use of a refractory hydraulic cement as the entire or a portion of the binder promotes the mechanical strength of the refractory body and thus reduces the risk of breakage or chipping of the body during handling prior to being installed and fired. Silico-clay based compositions may also be used particularly when the subjacent refractory body has a similar composition and behaves in a similar manner in response to temperature changes. High-alumina cements may also be used. High-alumina refractory blocks can be coated with a composition comprising 60% granular carbon mixed with a binding agent composed of 40% alumina and 60% chamotte granulates with 25% alumina. Such a binding agent will adhere very strongly to the blocks and is suitable for operating temperatures of about 1600° C. In coating a refractory block which is basic, a binding agent may be used which comprises a magnesium oxide cement mixed at the moment of use with sodium silicate for promoting quick setting. If the coating is to be subjected to a surfacing operation such an operation can be performed shortly after the coating has been deposited on the refractory body. Sodium silicate-based binders are particularly conducive to a formation of a highly cohesive coating composition.

A tar product such as asphalt can be used as a binding agent to maximize the amount of carbon in the coating, particularly when it is desired to maintain a reducing atmosphere.

Refractory-cement based binding agents have the advantage that because of their low porosity they very effectively fill the spaces between adjacent refractory blocks and thus protect the refractory blocks against attack by the bath of molten material. Various compositions of these binding agents will result in varying degrees of fluidity suited to different methods of applying the coating.

Silico-clay and high-clay cements can be given a paste-like consistency so that they can be applied with brushes or pneumatic guns providing that the grain size of the carbon or other dispersed material is sufficiently fine. Spraying of these cements can be carried out at a pressure of between 1–2 kg./cm.$^2$ depending upon the fluidity of the binding agent. Spraying is particularly suitable for applying molten metallic coatings. The coating thickness can be varied merely by varying the spraying time and/or the spray velocity. When liquid coating composition is sprayed onto porous ceramic or other refractory bodies the liquid can be made to penetrate the bodies so that very good adherence of the coating is obtained and there is no discontinuity of material.

Although spraying is relatively quick and results in a satisfactory adherence of the coating, the coating can also be applied by immersion or molding. The body may be immersed completely or partially in the fluid coating composition depending upon the extent to which the body is to be coated. The coating thickness is influenced by the proportion of binding agent to the dispersed phase, the nature of the binding agent and the speed at which the body is withdrawn from the coating composition.

Molding is particularly suitable when working with highly precise shapes. Molding can also be employed where the coating material to be applied comprises a substance in moldable condition and for applying compositions comprising a dispersion of carbon or other material in a moldable binder. This method is particularly suitable for applying a coating of carbon fibers distributed in a moldable binder. The molding process enables a completely flat and smooth surface to be obtained with a minimum, if any, subsequent surfacing treatment. Molding may also be used when a quick-setting binding agent is employed. The setting can be accelerated by using sodium silicate and magnesium sulfate.

It is preferable that the refractory blocks irrespective of their composition be degasified as completely as possible. Generally, the degasification should take place at a temperature of about 1200° C. or at a temperature which is at least equal to the temperature to which the refractories will be heated during use in the furnace. Degasification of refractory bodies to be used in constructing a furnace tank according to the present invention is desirable to avoid or reduce disturbance of subsequent furnace operation due to the evolution of gases when the furnace is in operation. Volatile products may be generated by phase modification occurring within the refractory materials or even in a non-refractory binder if used in the coating when the bodies are heated to higher temperatures.

For ordinary refractory bodies which often contain a relatively considerable amount of gas degasification is preferably performed before the coatings are deposited and preferably in an enclosure at subatmospheric pressure. The degasification conditions may be maintained for about 24 hours. The exact duration will be dependent in some part on the sizes of the refractory bodies being treated. The duration of the treatment period generally varies directly with the size of the bodies.

When a refractory body is formed by high pressure molding and has a porosity not substantially greater than 16–17%, the degasification may be performed after a coating has been deposited on the body since there is not a very large amount of gas in the body. However, even in this case it is preferred to continue degasification for the same period of time as when degasifying blocks of ordinary quality so that any volatile materials contained in the binding agent of the coating are also driven off.

The body being degasified is preferably progressively heated at such a rate so as to allow gases evolved at the temperature levels to be drawn off. The amount of gases given off at each stage can be readily controlled by adjusting the degree of vacuum in the degasification chamber.

It is pointed out that the presence of a refractory coating on the body will hinder to some extent the degasification process. This is particularly true if the coating completely envelopes the body. It may therefore be advantageous to degasify the refractory body prior to the coating process. In order to eliminate any necessity for a further degasification after coating it may be preferable to use a coating composition which is particularly stable over the range of working temperatures so that the coating will give off only a very small quantity, if any, of gas.

The above described degasification procedures may be carried out upon individual refractory blocks or assemblies of these blocks prior to the actual construction of the furnace tank. Degasification can also be performed after the tank has been constructed. In this event degasification should be performed just before the furnace is put into operation, or before the bath material is introduced. The degasification should be continued until temperatures are reached which are at least slightly above those existing in the furnace during normal operation.

When degasification is carried out after the furnace tank has been constructed the bath material may be introduced into the tank immediately after degasification of the tank walls. The molten material of the bath will then at least be partially melted by the heat accumulated in the furnace during degasification and the heat saving is appreciable. In addition to this economic advantage any tendency of the wall blocks to absorb gases after degasification is significantly reduced because the blocks are not returned to ambient temperature following degasification. Under normal conditions when blocks are stored and then transported after degasification there is a possibility that the blocks will absorb additional gases, such as water vapor from the atmosphere, unless special precautions are taken.

In spite of all precautions which can be taken a certain amount of gases which may disturb the operation of the furnace may be given off by the refractories during heating up or operation of the furnace. Such gases can be withdrawn by aspiration as by placing a gas collector at subatmospheric pressure in communication with an opening extending into the walls of the tank.

Figure 3:
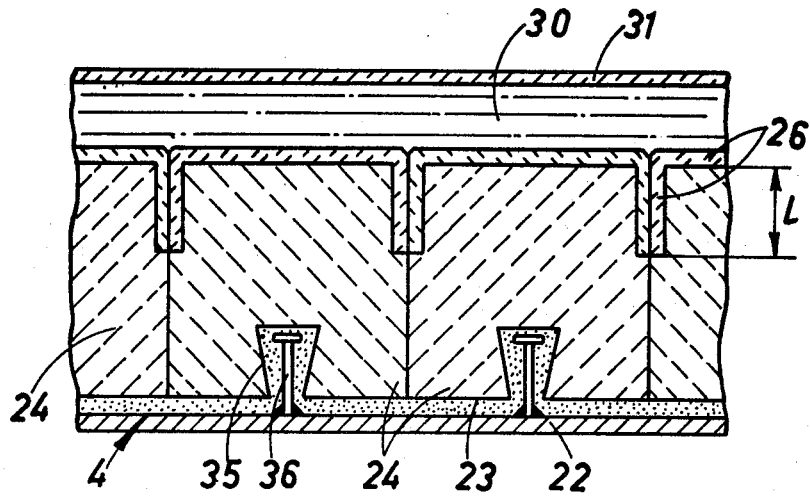
FIGS. 3–6 are transverse sectional views in enlarged scale of portions of bottom walls showing modifications according to the present invention.

In FIG. 3, the bottom wall 4 of the furnace tank is formed similarly to that illustrated in FIG. 2 but a layer 23 of refractory mortar is applied on the inner surface of the metal bottom wall 22. The refractory blocks 24 are positioned on the layer 23. The mortar also fills the anchoring cavities 35 similar to that shown in FIG. 2.

The refractory blocks 24 in the modification of FIG. 3 have a reduced cross section for a distance L as measured from the top face of the brick. The reduced portion of each block is coated with a carbon-rich coating composition so that the coated block has a uniform rectangular section. It is preferable to use a binding agent which is suitable for molding when the coating is applied in this manner so that the side faces of the blocks will be smooth and flat and will thus enable an accurate assembly of the blocks in side-by-side relation. The close fit of adjacent lateral faces of the blocks will prevent molten bath material from penetrating the spaces between the blocks and from reaching those portions of the faces of the blocks which are not protected by the coating.

Figure 4:
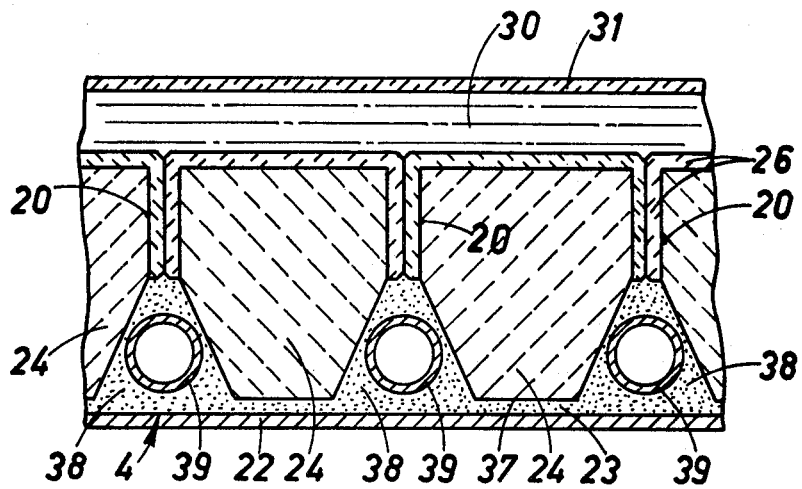

The modification FIG. 4 is similar to that of FIG. 3 in that the coating 26 extends over a portion 20 of the four lateral faces of each block 24. The uncoated portion of each block has the shape of an inverted truncated pyramid. The bottom face of each block rests on the layer of cement 23 which also occupies spaces 38 formed between the lower edges of adjacent blocks. The result is a network of longitudinal and transverse channels between the lower portions of the assembly of blocks. Adjacent blocks contact each other only through their coatings 20. A thermal conditioning fluid flows through pipes 39 positioned in the spaces 38 and inbedded in the cement occupying these spaces. The tubes 39 permit the temperature of the bath of molten material to be controlled so that a desired temperature gradient can be maintained in a predetermined direction.

Figure 5:
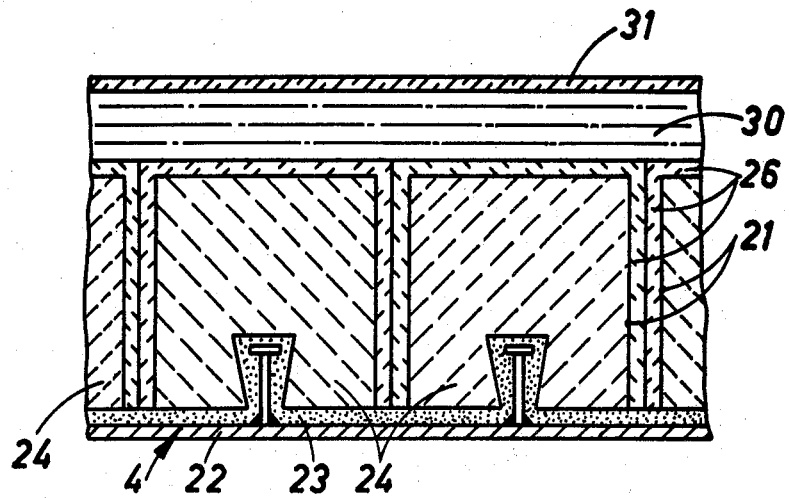

In FIG. 5, a refractory coating having a composition different from that of the refractory blocks is applied to the top and four lateral faces of the blocks. Thus all of the lateral faces are completely covered by the coating composition in the same manner as illustrated for the side faces 21. All of the lateral faces may be covered with a carbon-based composition in order to provide good thermal conductivity along the tank floor in both the transverse and longitudinal directions. If good heat conduction is required in one direction only such as in a direction perpendicular to the plane of the drawing the coatings on the side face 21 of each block will be so selected so as to have less heat conductivity than the coatings on the other side faces.

Figure 6:
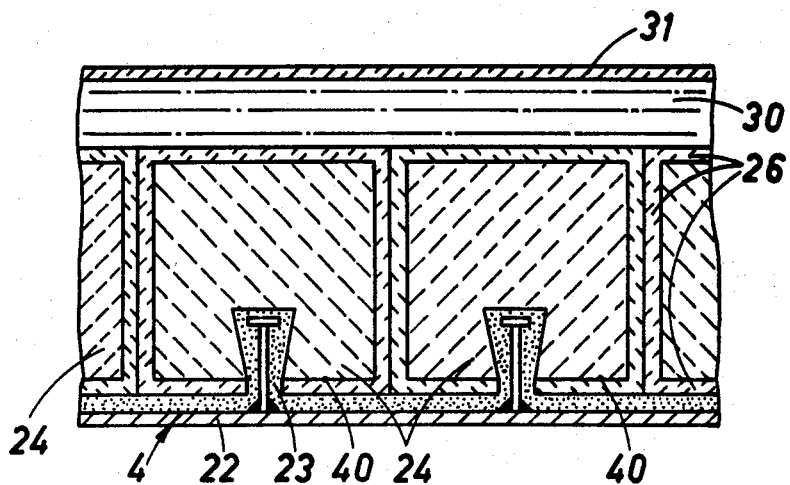

In the modification of FIG. 6 the refractory blocks forming the bottom wall of the tank are provided with a refractory coating on all of their faces including their bottom faces. The composition of the refractory coating is different from that of the refractory blocks. In a similar manner the completely coated blocks are positioned on a layer of cement 23 distributed on the metal shell 22.

It is thus apparent that the present invention discloses refractory bodies in the form of blocks or slabs which can be assembled as conventional refractory blocks but whose surfaces which are exposed to the contents of the tank are provided with characteristics advantageous with respect to these contents. The different refractory compositions used in each composite refractory body according to the present invention can be independently selected so as to impart different desired characteristics to each body. The amount of refractory material required for coatings of the refractory blocks is comparatively small and thus expensive substances can be used for such refractory coatings without making the overall cost of a refractory block prohibitive.

Composite refractory bodies as disclosed in the present invention may be used in constructing all of the furnace walls, some of the walls or only those regions of the tank which are subjected to the maximum temperatures during operation and where the corrosive action of the bath material is the maximum. When only the floor is constructed as disclosed herein the floor may comprise a single monolithic cast refractory mass having a refractory coating or a plurality of refractory blocks each having an adherent surface coating of a different refractory composition from that of the block body.

When the refractory coating composition has a higher thermal conductivity than the refractory material of the body the transfer of heat from one region of the bath to another is significantly facilitated. This is particularly desirable when manufacturing flat glass by the float process since temperature gradients along transverse sections of the bath can be avoided or significantly reduced. While promoting this heat transfer the refractory bodies will have the necessary high resistance to heat conduction from the interior of the tank to the exterior thereof and also function to insulate the bath of molten material from the outside atmosphere.

The material of the refractory coating is so selected that it does not contain any phases capable of giving off any volatile material at operating temperatures. The absence of any volatile material evolved from any of the refractories of the furnace walls enables the atmosphere within the furnace to be carefully controlled and thus the likelihood of any harmful reactions to the glass is avoided. When a glass ribbon is floated on a bath of molten tin the bath can be kept free from oxidation so that the surface of the ribbon which is in contact with the bath will acquire a satisfactory polish.

The production of refractory bodies according to the present invention is facilitated when a coating of refractory material is to be applied to only one face of a block. When only one face is coated, there will be no reduction in the resistance to heat transmission through the refractory bodies when they are assembled into a structural unit. Coating at least a part of the side faces the refractory bodies may be desirable when a composition of a refractory body is such that liquid or gaseous phases are given off when the refractory is exposed to direct contact with the molten material of the bath at operating temperatures. The refractory coating at least over portions of the adjoining side faces of the blocks imparts greater surface strength to the blocks since these side faces tend to be strongly stressed under the working conditions encountered within a furnace tank. The extent to which the sides of the refractory blocks are coated and the composition of the refractory material will largely depend on the operational conditions to which the refractories will be subjected. By coating the entire areas of the side faces of the blocks it will be easy to obtain side surfaces which are smooth and flat, particularly when the coating composition as applied incorporates a flowable binding agent, so that adjacent refractory blocks can be accurately positioned in side-by-side relationship. The same advantages are achieved if the refractory blocks are completely coated with a refractory composition.

The refractory bodies according to the present invention may be formed with passages through which a thermal conditioning fluid can be flowed. The fluid may flow directly in the passages or in tubing positioned therein.

Machining of surfaces of refractory blocks according to the present invention is particularly desirable when the surfaces are formed by a coating of carbon or a carbon-based composition. A machining process will polish and smooth the surface of the refractory and will eliminate the tendency of molten material to become attached to this face of the refractory. By preventing the molten material from sticking to surfaces of the refractory lining eddy currents in the bath will be eliminated. The absence of eddy currents is important in producing float glass of high quality. Machining of the contacting surfaces of refractory blocks may also provide blocks of more uniform and accurate dimensions so as to facilitate the assembly of the blocks into a structural unit.

A binding agent for the refractory coating may be one which hardens when heated but the coating remains unhardened. This facilitates positioning of the refractory blocks since the relative plastic nature of the coating enables the blocks to be closely positioned during assembly. When the furnace is placed in use, the heat will then harden the coating. The use of such a coating eliminates applying a cement or mortar in the joints between the blocks and also saves considerable time in construction of a furnace.

An important advantage of the composite refractory blocks disclosed herein is the elimination of anchoring means to maintain those refractory surfaces in contact with the bath in fixed relationship to a layer of insulated refractory blocks upon which the surfaces are positioned.

The present invention also includes a method of treating or producing flat glass floating on a bath of molten material with the bath being retained in a furnace tank constructed either wholly or partially of refractory blocks according to the present invention.

It will be understood that the present invention is susceptible to modification in order to adapt to different usages and conditions.

What is claimed is:

1. A float glass furnace for floating glass on a liquid bath of molten material having a wall comprising a plurality of ceramic refractory blocks positioned side-by-side to form said wall, each of said refractory blocks having a coating layer rich in carbon on its inner face which is resistant to corrosion for contacting said liquid bath, said coating layer extending from said inner face a substantial distance along the side faces of each block and providing a refractory carbon-rich coating over portions of the adjoining side faces of the blocks so that the molten material of the bath is prevented from making contact with the refractory blocks to protect the same from corrosion during the glass floating operation of the furnace.

2. In a furnace tank as claimed in claim 1 wherein said refractory coating has a conductivity of at least 5 kilo calories per meter per hour per degree centigrade.

3. In a furnace tank as claimed in claim 1 wherein said refractory coating was in the flowable state when applied to the refractory body and has set in situ.

4. In a furnace tank as claimed in claim 2 wherein said refractory coating is a tungsten coating.

5. In a furnace tank as claimed in claim 3 wherein said refractory coating comprises a refractory material dispersed in a binder.

6. In a furnace tank as claimed in claim 5 wherein said dispersed material is carbon or a carbon-rich substance.

7. In a furnace tank as claimed in claim 5 wherein said binder is rich in carbon.

8. In a furnace tank as claimed in claim 7 wherein said binder is a tar product.

9. In a furnace tank as claimed in claim 5 wherein said binder comprises a silicate of sodium.

10. In a furnace tank as claimed in claim 5 wherein said binder comprises a refractory hydraulic cement.

11. In a furnace tank as claimed in claim 5 wherein said binder is a silica-clay based composition.

12. In a furnace tank as claimed in claim 1 wherein a refractory body is incapable of giving off substance in volatilized form at the operating temperature of the furnace tank.

13. In a furnace tank as claimed in claim 1 wherein a refractory body has a coating only on its face directed toward the interior of the furnace.

14. In a furnace tank as claimed in claim 1 wherein a refractory body has a refractory coating on at least a portion of a face contiguous with the face directed toward the interior of the furnace.

15. In a furnace tank as claimed in claim 14 wherein a refractory body has a refractory coating on all faces thereof so as to completely envelope the body.

16. In a furnace tank as claimed in claim 14 wherein a plurality of refractory bodies are assembled into a furnace wall with the refractory coatings on contiguous faces of adjacent bodies occupying the joints formed therebetween.

17. In a furnace tank as claimed in claim 1 wherein the refractory coating is machined.

18. In a furnace tank as claimed in claim 1 and comprising means associated with said furnace tank for evacuating any gases evolved from a furnace wall.

19. In a furnace tank as claimed in claim 1 wherein a refractory body is degasified.

References Cited

UNITED STATES PATENTS

| | | | |
|---|---|---|---|
| 1,249,636 | 12/1917 | Keyes | 263—48 |
| 3,148,238 | 9/1964 | Willenbrock, Jr. | 266—43 |
| 3,218,050 | 11/1965 | Healy et al. | 263—46 |
| 3,332,763 | 7/1967 | Basler et al. | 65—182 |
| 3,334,983 | 8/1967 | Badger et al. | 65—182 |
| 1,674,947 | 6/1928 | Bunce et al. | 13—23 |

ARTHUR D. KELLOGG, Primary Examiner

U.S. Cl. X.R.

65—356, 374; 263—46, 48; 110—14; 266—43